United States Patent
Bray et al.

(10) Patent No.: US 12,370,749 B2
(45) Date of Patent: Jul. 29, 2025

(54) CONTAINED WELDING

(71) Applicant: Branson Ultrasonics Corporation, Brookfield, CT (US)

(72) Inventors: Jeremiah Bray, West Haven, CT (US); Marcus Chiesa, New Milford, CT (US); Tom Hoover, Salt Point, NY (US); David Devine, La Grange, IL (US)

(73) Assignee: Branson Ultrasonics Corporation, Brookfield, CT (US)

( * ) Notice: Subject to any disclaimer, the term of this patent is extended or adjusted under 35 U.S.C. 154(b) by 206 days.

(21) Appl. No.: 18/064,153

(22) Filed: Dec. 9, 2022

(65) Prior Publication Data
US 2024/0190084 A1   Jun. 13, 2024

(51) Int. Cl.
*B29C 65/08* (2006.01)
*B29C 65/00* (2006.01)
*B29C 65/16* (2006.01)

(52) U.S. Cl.
CPC .......... *B29C 65/08* (2013.01); *B29C 65/1635* (2013.01); *B29C 66/8511* (2013.01)

(58) Field of Classification Search
None
See application file for complete search history.

(56) References Cited

U.S. PATENT DOCUMENTS

| | | | |
|---|---|---|---|
| 9,090,364 B2 | 7/2015 | Vietz et al. | |
| 10,119,108 B2 | 11/2018 | Maggiore | |
| 10,449,698 B2 | 10/2019 | Nishikawa et al. | |
| 2022/0134675 A1 | 5/2022 | Vichniakov et al. | |

FOREIGN PATENT DOCUMENTS

| | | | |
|---|---|---|---|
| EP | 1745916 A | * | 1/2007 |
| JP | S6422536 A | | 1/1989 |
| JP | 4042664 B2 | | 2/2008 |

OTHER PUBLICATIONS

CN 209535930 U machine translation (Year: 2019).*
https://www.collinsdictionary.com/us/dictionary/english/seal (Year: 2025).*
European Search Report regarding European Patent Application No. 23215028.4, dated Apr. 26, 2024.

* cited by examiner

*Primary Examiner* — Barbara J Musser
(74) *Attorney, Agent, or Firm* — Harness, Dickey & Pierce, P.L.C.

(57) ABSTRACT

A welding process includes inserting two work pieces inside a sealable container. Placing the container with the two work pieces inside into a welding device and welding the two members together while inside the container.

23 Claims, 7 Drawing Sheets

CONTAINED WELDING

FIELD

The present disclosure relates to contained welding.

BACKGROUND

This section provides background information related to the present disclosure which is not necessarily prior art.

It is common in many industries to require sterile components and devices to be packaged and shipped in a sterile container. When complex manufacturing is required, the components and devices are commonly manufactured in one location and shipped to another location for sterilization and packaging. The manufacturing process can sometimes include welding, machining, stamping and other assembly processes.

SUMMARY

This section provides a general summary of the disclosure, and is not a comprehensive disclosure of its full scope or all of its features.

The present disclosure provides a laser welding process and an ultrasonic welding process that is performed on a work piece or work pieces that are inserted in a sealed container while maintaining an isolated environment within the container.

According to an aspect of the present disclosure, an isolated environment may be a sterilized one.

According to a further aspect of the present disclosure, an isolated environment may be a hazardous one.

According to a further aspect of the present disclosure, a welding process includes inserting two work pieces inside a sealable container. The container is placed into a welding device and the two work pieces are welded together while inside the container.

According to a further aspect, the welding process includes sterilizing the two work pieces prior to inserting the two work pieces inside the container.

According to a further aspect, the sterilizing the two work pieces and inserting the two work pieces inside the container happens at a first location and welding the two work pieces together happens at a second location different than the first location.

According to a further aspect, the welded two work pieces are transported to a third location within the sealable container.

According to a further aspect, the sealable container is a bag.

According to a further aspect, the sealable container is plastic wrap.

According to a further aspect, the sealable container is flexible.

According to a further aspect, the inserting two work pieces inside a sealable container is performed in a clean environment.

According to a further aspect, the inserting two work pieces inside a sealable container is performed in a hazardous environment.

According to a further aspect, the welding device is an ultrasonic welder.

According to a further aspect, the welding device is a laser welder.

According to a further aspect, the laser welder performs one of a scan, trace, roller ball and simultaneous laser welding.

According to a further aspect, the welding device is one of an ultrasonic, vibration, spin, and thermal welding device.

According to a further aspect, the container includes one of a clear and laser transmissive flexible bag, sealed plastic wrap and rigid box.

According to another aspect, a welding process includes inserting at least one work piece inside a sealable container; placing the container with the at least one work piece inside into a welding device; performing one of an ultrasonic or a laser weld on the at least one work piece while the at least one work piece is inside the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
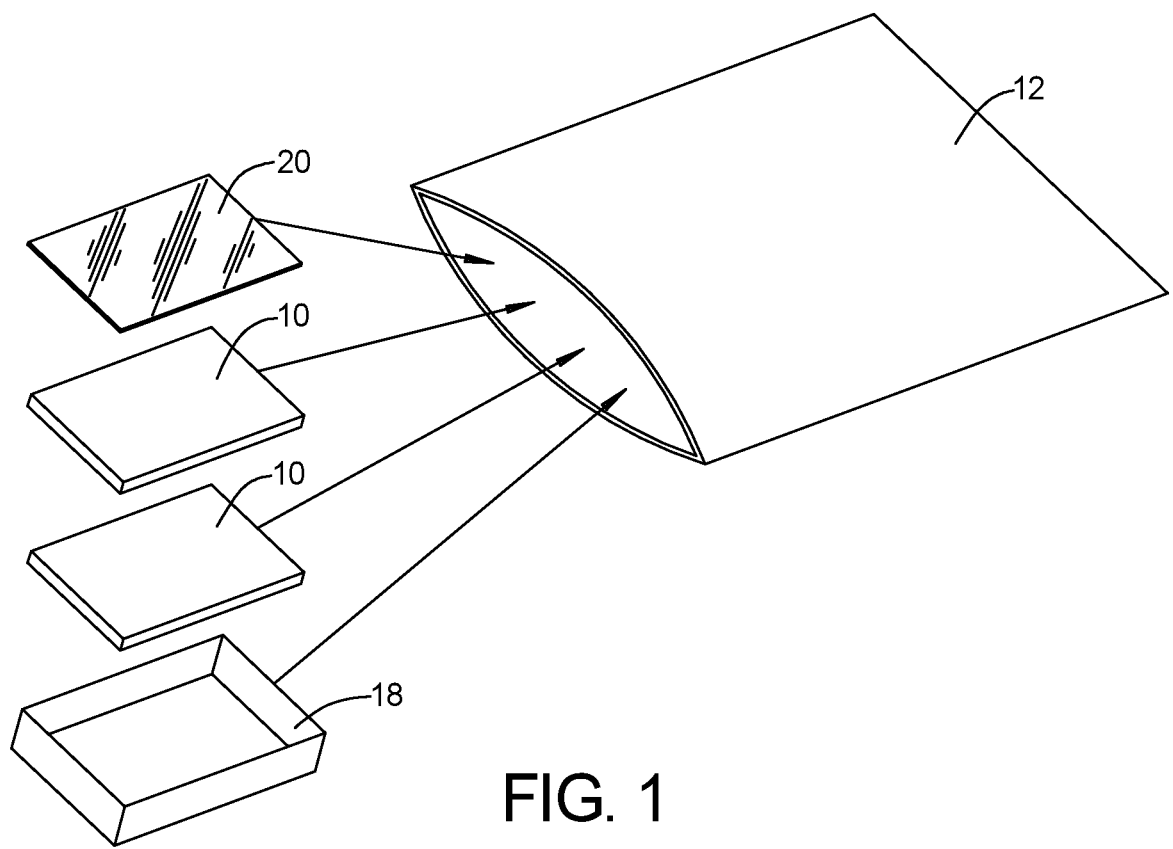
FIG. 1 is a perspective view of a pair of sterile work pieces being inserted into a sterile container.
Figure 2:
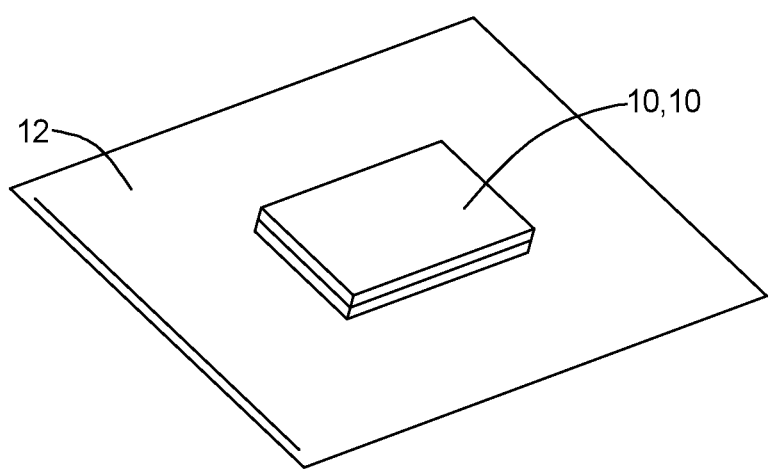
FIG. 2 is a perspective view of the pair of sterile work pieces inside a sealed sterile container.

Example embodiments will now be described more fully with reference to FIGS. 1-4, a welding process according to the principles of the present disclosure will now be described. With reference to FIG. 1, the welding process includes placing one or more work pieces 10 into a sealed container 12 as shown in FIG. 2. The work pieces 10 can include two or more work pieces that are intended to be welded together or can be, for example, a single work piece on which a sealing weld may be applied. The work piece(s) 10 can be plastic work pieces. The work piece(s) 10 can also be sterilized before insertion into the sealed container 12. The sealed container 12 can include a bag such as a plastic bag, a plastic wrap, a clear plastic container, a flexible sealed container, a sealed glass container, or a sealed acrylic container. The container 12 can be made of a laser transmissive material.

Figure 3:
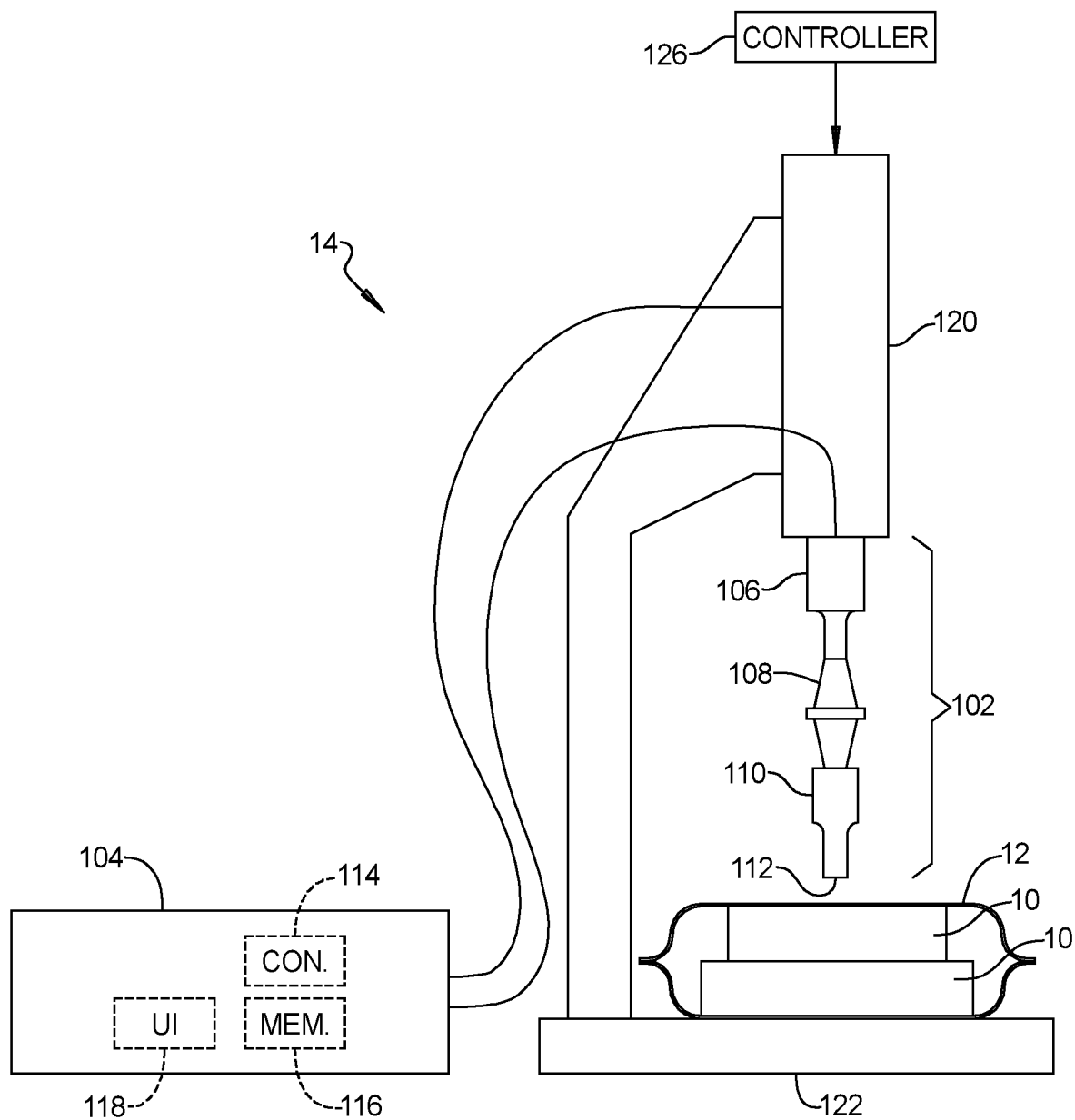
FIG. 3 is a schematic view of the pair of sterile work pieces inside a sealed sterile container within an ultrasonic welding device.

As shown in FIG. 3, the container 12 with the work piece(s) 10 sealed therein can then be placed into a work piece processing device 14, as shown in FIG. 3. The work piece processing device 14 can include an ultrasonic welder (see FIG. 3) or a laser welder (see FIG. 4). The work piece processing device 14 is pressed against workpiece(s) 10 by the movement of actuator 14 to process work piece(s) 10. The pressing may be accomplished by a pneumatic actuator, a servo-actuator, or other method of actuation. The work piece processing device 14 may for example be an ultrasonic stack of an ultrasonic welder or an ultrasonic sealer and an ultrasonic horn of the ultrasonic stack is what physically contacts work piece(s) 10. In such cases, the work piece processing device 14 is energized ultrasonically to work on work piece(s) 10 to process it, such as by ultrasonic welding or ultrasonic sealing, as applicable. The work piece processing device 14 can be controlled by a controller 114.

A welding operation is performed on the work piece(s) 10 through the sealed container 12. Once the welding operation is performed on the work piece(s) 10, the welded work piece(s) 10 can then be transported within the sealed container 12 to another process, back into an isolated environment, or to a final destination.

With reference to FIG. 3, a model of a typical prior art welding device 14 having an ultrasonic stack 102 and ultrasonic power supply 104 is shown. It should be understood that ultrasonic system 14 can be any type of ultrasonic system that has an ultrasonic stack excited by an ultrasonic power supply. Typical components of ultrasonic stack 102 include an ultrasonic converter 106, a booster 108 and an ultrasonic horn 110. It should be appreciated that not every ultrasonic stack 102 includes booster 108. Booster 108 and ultrasonic horn 110 are connected (directly or via another component) to ultrasonic converter 106. In the example of FIG. 3, booster 108 is mounted to ultrasonic converter 106 connecting booster 108 to ultrasonic converter 106, and ultrasonic horn 110 is mounted to booster 108 connecting ultrasonic horn 110 to booster 108, and thus connecting ultrasonic horn 110 to ultrasonic converter 106 via booster 108.

Power supply 104 is controlled by the controller 114 that includes memory 116. It should be understood that controller 114 can be included in power supply 104 or separate from power supply 104.

Ultrasonic system 14 will often include an anvil 122 on which work piece(s) 10 to be processed will be supported and contacted by ultrasonic horn when it is being processed. For example, if two plastic work pieces 10 are being welded together, they are supported on anvil 122 and pressed together by the ultrasonic horn during the weld process as actuator 120 moves ultrasonic stack 102 relative to the two parts 124 where the horn also ultrasonically vibrates against one of the parts to ultrasonically weld the two work piece(s) 10 together. Actuator 120 is controlled by a controller 126 which may be a separate controller from controller 114 of ultrasonic power supply 104 or controller 114 of ultrasonic power supply 104 may control actuator 120.

Figure 4A:
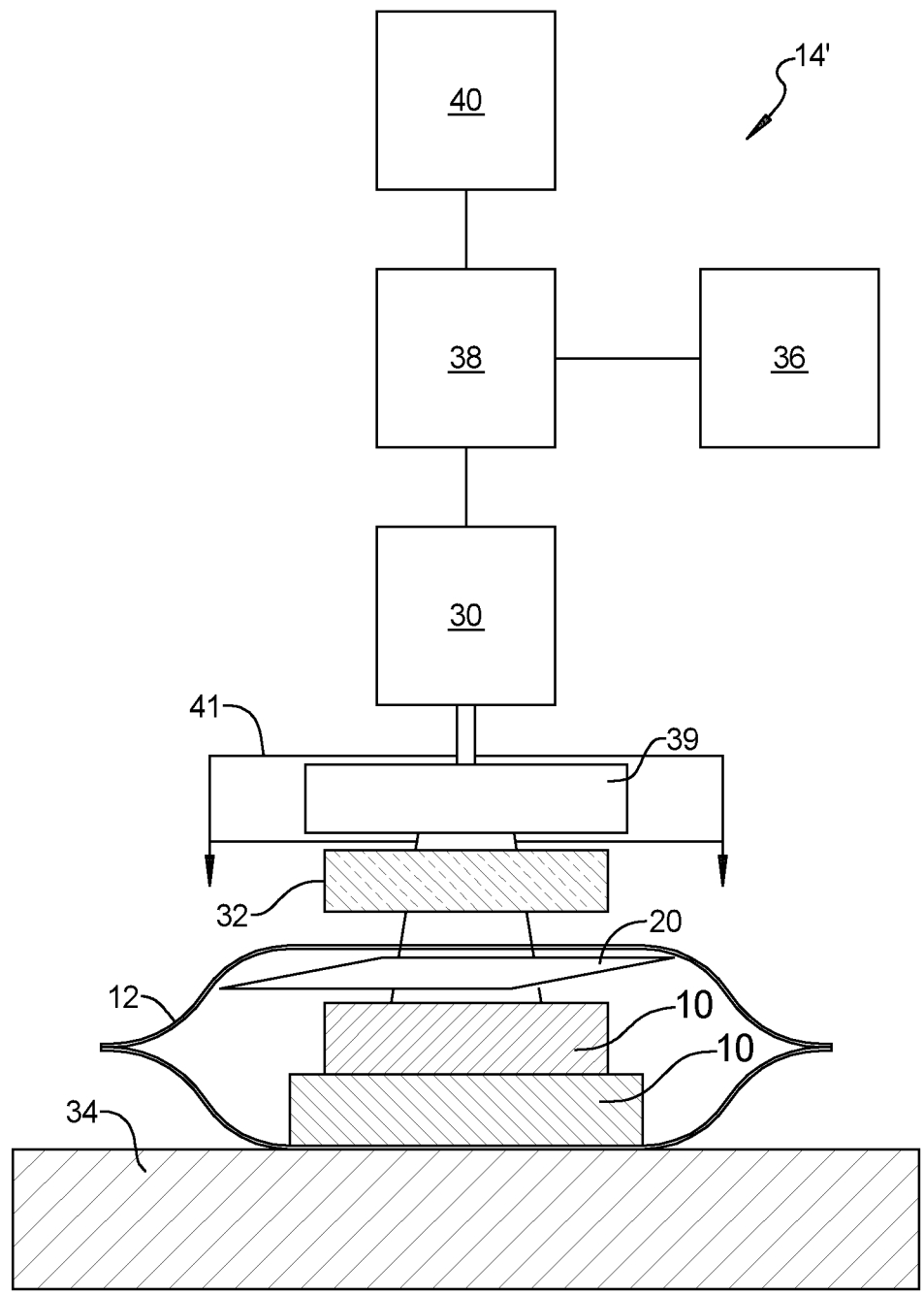
FIGS. 4A-4B are schematic views of the pair of sterile work pieces inside a sealed sterile container within a laser welding device.
Figure 4B:
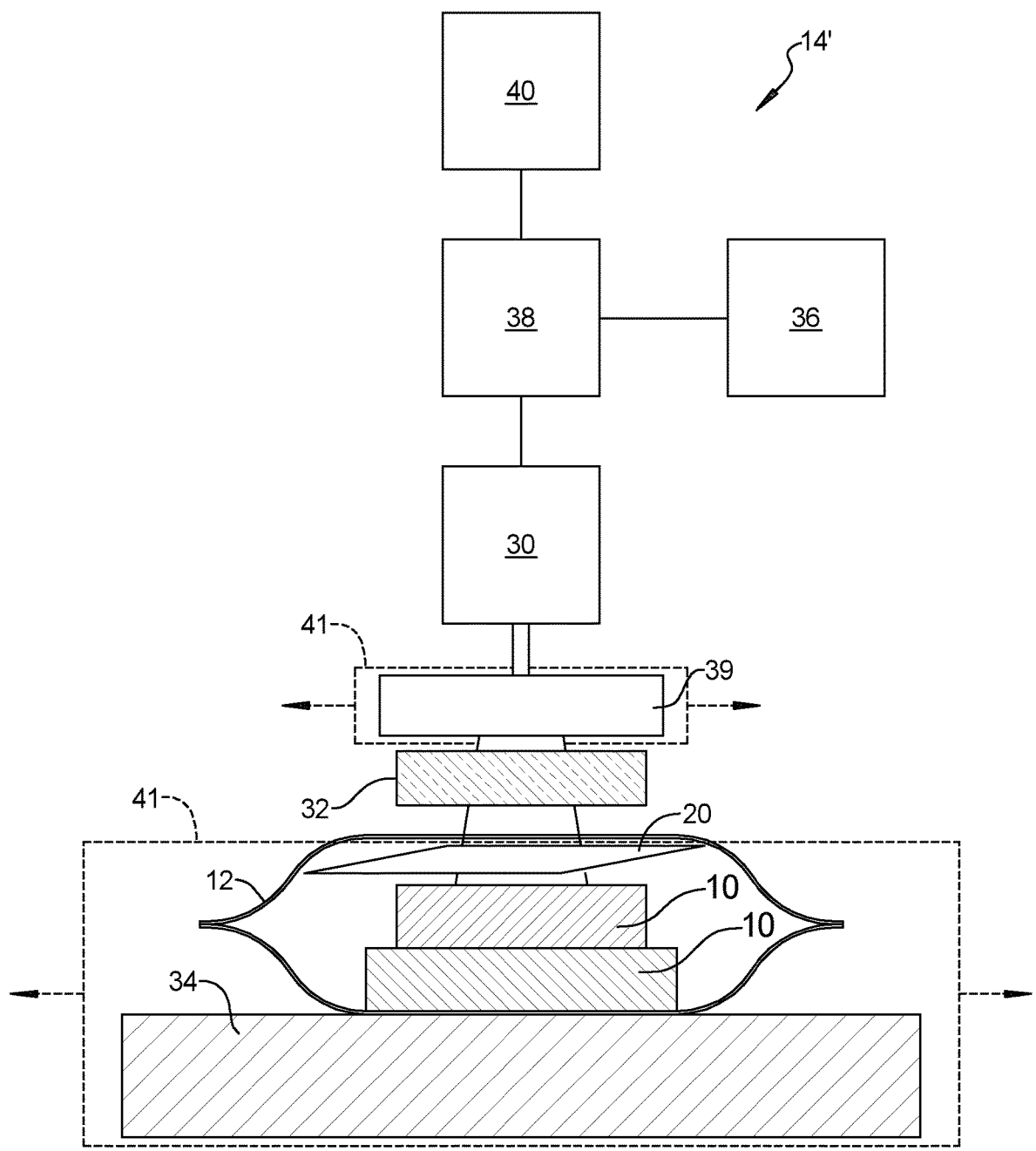
Figure 5A:
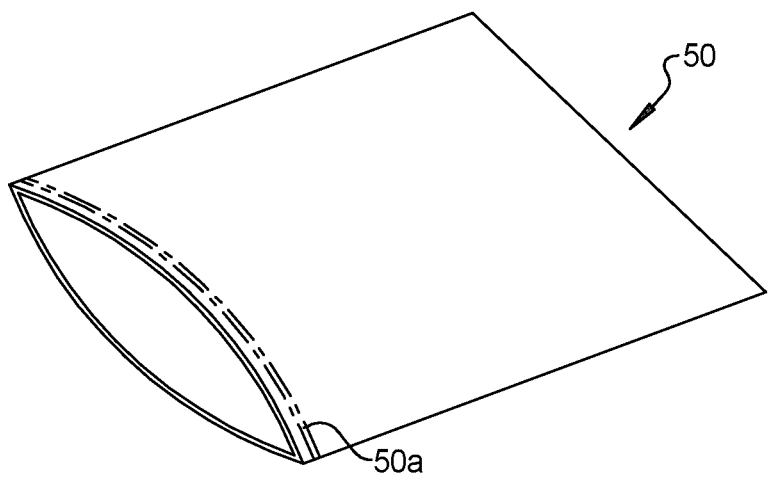
FIGS. 5A-5E show various containers that can be used.
Figure 5B:
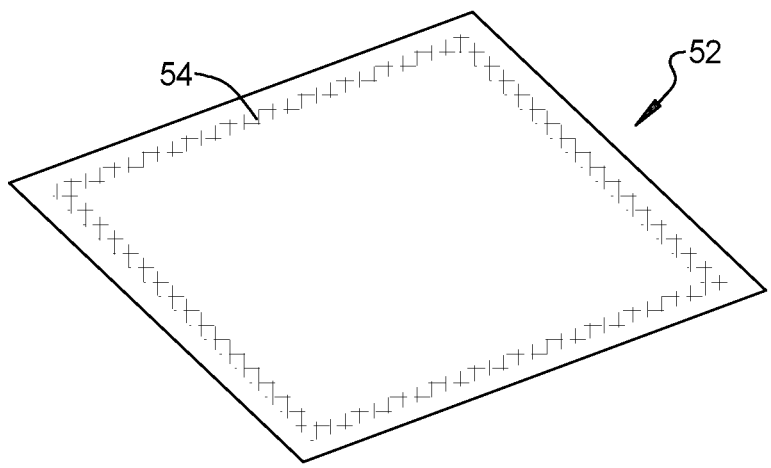
Figure 5C:
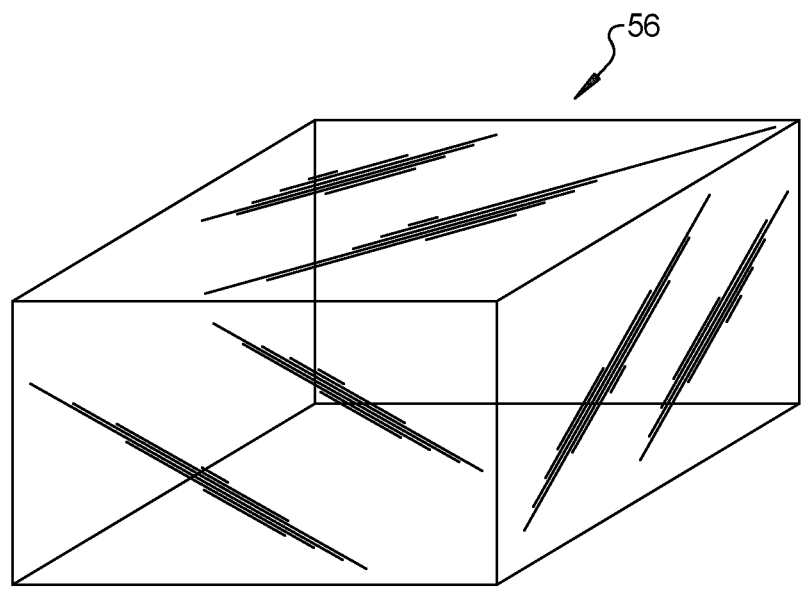
Figure 5D:
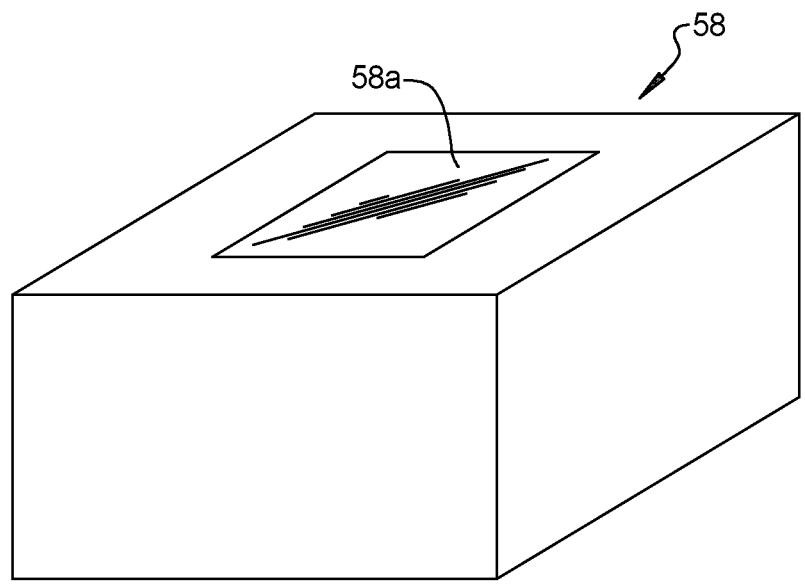
Figure 5E:
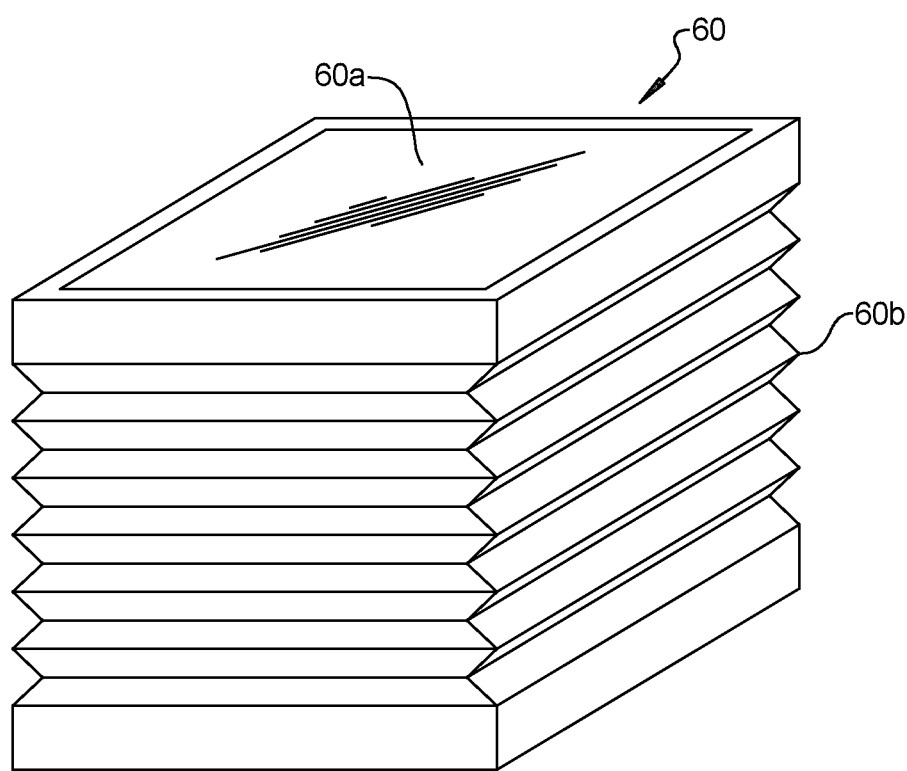

With reference to FIGS. 4A and 4B, a model of a typical laser welding device 14' is shown for processing a workpiece(s) 10 within the sealed container 12. The laser welding device 14' can include a laser beam emitter 30, a device to direct the laser energy 39, a transmitting medium 32, a mechanism 41 to compress or move the workpiece(s) 10, and a platform 34 on which the workpieces are welded. The transmitting medium 32 may accomplish any or none of the following: the medium 32 may contact the workpiece(s) under pressure from mechanism 41; the medium 32 may control the direction or amount of laser energy; the medium 32 and the mechanism 41 may compress workpiece(s) 10. The laser directing device 39 may be attached to the mechanism 41, with an optional transmitting medium 32. As shown in FIG. 4B, the mechanism 41 may move the workpiece(s) 10 and laser directing device 39 relative to each other, with an optional transmitting medium 32. Either the laser directing device 39 or the workpiece(s) 10 may remain stationary or be moved in any direction relative to the other by the actuation of the mechanism 41. A power supply 36 is controlled by a controller 38 that includes a memory 40. It has been discovered that the laser welding can be performed through a container 12 without causing the container to stick to the work piece(s) 10.

It should be understood that other optional fixtures 18 can be inserted into the container 12 along with the workpiece(s) 10. The fixtures 18 can secure the workpiece(s) 10 in a desired position relative to one another. In addition, in the case of laser welding, a panel 20 can be inserted into the sealed container 12 along with the workpiece(s) and serve to further isolate the generated heat from the container 12. This panel may be rigid or flexible. A desiccant can be inserted in the container to absorb any moisture generated by the welding process.

Examples of expected typical containers are depicted in FIGS. 5A-5E. Shown in FIG. 5A, the container may be a re-sealable flexible bag 50 with, for example, a zip lock 50*a*. Shown in FIG. 5B, the container may be flexible plastic sheet 52 with a one-time seal 54. This can include heat sealing, welding, adhesive or any sort of permanent sealing. Shown in FIG. 5C, the container may be a rigid enclosure 56 that is laser-transparent, relative to wavelengths of light used for laser welding. Shown in FIG. 5D, the container can be a rigid enclosure 58 with only a portion 58*a* being laser-transparent, relative to wavelengths of light used for laser welding. Shown in FIG. 5E, the container may be an enclosure 60 with rigid portions 60*a* and flexible portions 60*b* joined together with at least a portion of the rigid portions 60*a* being laser transparent.

The workpieces 10 can be inserted into the sealable container 12 in an isolated environment that can include one of a sterilized environment or a hazardous environment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A welding process, comprising:
   sterilizing two work pieces;
   inserting the two sterilized work pieces inside a sealable container;
   sealing the sealable container with the two sterilized work pieces fully enclosed inside and isolated from outside of the container;
   placing the sealable container with the two sterilized work pieces sealed inside into a welding device; and
   welding the two sterilized work pieces together while sealed inside the sealable container.

2. The welding process according to claim 1, wherein the sterilizing the two work pieces and inserting the two work pieces inside the sealable container happens at a first location and welding the two work pieces together happens at a second location different than the first location.

3. The welding process according to claim 2, wherein the welded two work pieces are transported to a third location within the sealable container.

4. The welding process according to claim 1, wherein the inserting two sterilized work pieces inside a sealable container is performed in an isolated environment.

5. The welding process according to claim 1, wherein the welding device is an ultrasonic welder.

6. The welding process according to claim 5, further comprising inserting a fixture in the container with the two work pieces within the fixture.

7. The welding process according to claim 1, wherein the welding device is a laser welder.

8. The welding process according to claim 7, further comprising inserting a laser transmissive member inside the container with the two work pieces.

9. The welding process according to claim 7, wherein the laser welder performs one of a scan, trace, roller ball and simultaneous laser welding.

10. The welding process according to claim 1, wherein the welding device is one of an ultrasonic, vibration, spin, and thermal welding device.

11. The welding process according to claim 1, wherein the container includes one of a clear and laser transmissive flexible bag, sealed plastic wrap and rigid container.

12. A welding process, comprising:
    inserting two work pieces inside a sealable container;
    sealing the sealable container with the two work pieces fully enclosed inside and isolated from outside of the container;
    placing the sealable container with the two work pieces sealed inside into a welding device; and
    welding the two work pieces together while sealed inside the sealable container;
    wherein the sealable container is flexible.

13. The welding process according to claim 12, wherein the sealable container is plastic wrap.

14. The welding process according to claim 12, wherein the sealable container is a bag.

15. A welding process, comprising:
    sterilizing at least one work piece
    inserting the at least one sterilized work piece inside a sealable container;
    sealing the sealable container with the at least one sterilized workpiece fully enclosed inside and isolated from outside of the container;
    placing the sealable container with the at least one sterilized work piece sealed inside into a welding device;
    performing one of an ultrasonic or a laser weld on the at least one sterilized work piece while the at least one sterilized work piece is sealed inside the sealable container.

16. The welding process according to claim 15, wherein the sterilizing the at least one work piece and inserting the at least one work piece inside the container happens at a first location and ultrasonic welding the at least one work piece happens at a second location different than the first location.

17. The welding process according to claim 16, wherein the ultrasonic welded at least one work piece is transported to a third location within the sealed sealable container.

18. The welding process according to claim 15, wherein the inserting at least one work piece inside a sealable container is performed in an isolated environment.

19. The welding process according to claim 15, further comprising inserting a laser transmissive member inside the sealable container with the at least one work piece.

20. A welding process, comprising:
   inserting at least one work piece inside a sealable container;
   sealing the sealable container with the at least one workpiece fully enclosed inside and isolated from outside of the container;
   placing the sealable container with the at least one work piece sealed inside into a welding device;
   performing one of an ultrasonic or a laser weld on the at least one work piece while the at least one work piece is sealed inside the sealable container;
   wherein the sealable container is flexible.

21. The welding process according to claim 20, wherein the sealable container is a bag.

22. The welding process according to claim 20, wherein the sealable container is plastic wrap.

23. A welding process, comprising:
   inserting at least one work piece inside a sealable container;
   sealing the sealable container with the at least one workpiece fully enclosed inside and isolated from outside of the container;
   placing the sealable container with the at least one work piece sealed inside into a welding device;
   performing one of an ultrasonic or a laser weld on the at least one work piece while the at least one work piece is sealed inside the sealable container; and
   inserting a fixture in the sealable container with the at least one work piece within the fixture.

* * * * *